United States Patent [19]

Kapur et al.

[11] 4,388,286
[45] Jun. 14, 1983

[54] SILICON PURIFICATION

[75] Inventors: Vijay K. Kapur, Northridge; Uppala V. Choudary, Chatsworth, both of Calif.

[73] Assignee: Atlantic Richfield Company, Los Angeles, Calif.

[21] Appl. No.: 343,046

[22] Filed: Jan. 27, 1982

[51] Int. Cl.³ .............................................. C01B 33/02
[52] U.S. Cl. ..................................................... 423/348
[58] Field of Search .......................... 423/348; 134/39; 210/773, 718

[56] References Cited

U.S. PATENT DOCUMENTS 3,442,622 5/1969 Monnier et al. ................. 423/348 X
4,304,763 12/1981 Dietl et al. ............................ 423/348

FOREIGN PATENT DOCUMENTS 907855 10/1962 United Kingdom ................ 423/348

Primary Examiner—O. R. Vertiz
Assistant Examiner—Steven Capella
Attorney, Agent, or Firm—Roderick W. MacDonald

[57] ABSTRACT

A method for refining silicon to produce a high purity silicon product for re-use in industries which demand high purity silicon starting material, comprising vacuum refining said silicon to remove gaseous CO and SiO followed by mixing with an effective fluxing material of at least one fluoride of alkali metals and/or alkaline earth metals, heating the mixture at a temperature and time sufficient to produce a molten silicon phase and a slag phase, and separating the slag from the silicon for recovery of the silicon for re-use.

7 Claims, No Drawings

SILICON PURIFICATION

BACKGROUND OF THE INVENTION

In industries such as the semiconductor industry and photovoltaic industry which require a high purity silicon starting material, the processing of the silicon material often generates waste silicon due to grinding, sawing, and the like. Such waste silicon is normally in the form of a slurry of small silicon particles mixed with other impurities such as carbon and the like. Substantial cost is involved in obtaining the high purity silicon in the first place and the high purity silicon scrap is desirably recovered in a pure form suitable for re-use in the manufacturing processes in which the waste silicon was generated in the first place. Accordingly, it is highly desirable to have a process which not only will recover the silicon but will recover it in a state of purity which is acceptable for the demanding semiconductor and photovoltaic industries.

SUMMARY OF THE INVENTION

In accordance with this invention, high purity, fine particle silicon which would otherwise be waste material is recovered by a combination of vacuum refining followed by mixing with an effective fluxing material of at least one fluoride of a metal selected from the group consisting of alkali metals and alkaline earth metals. The mixture is heated at an elevated temperature and for a time sufficient to produce molten silicon and slag as separate phases. Thereafter the slag and silicon phases are separated and the silicon recovered for re-use in the making of semiconductors, photovoltaic wafers, and the like.

Accordingly, it is an object of this invention to provide a new and improved method for refining silicon. It is another object to provide a new and improved method for recovering waste silicon of high purity from saw slurry for re-use in the semiconductor and photovoltaic industries.

Other aspects, objects and advantages of this invention will be apparent to those skilled in the art from this disclosure and the appended claims.

DETAILED DESCRIPTION OF THE INVENTION

In the normal processing of silicon into semiconductors, photovoltaic wafers, and the like, a substantial amount of the high purity feed silicon ends up as contaminated scrap material during sawing of solicon ingots. For example, a single crystal silicon ingot of sufficiently high purity to be used for sawing into thin wafers for photovoltaic panels is supported on a carbon beam while the wafers are sawed therefrom so that a substantial amount of carbon impurity is mixed with the resulting waste silicon sawdust.

It is highly desirable to be able to recover this high purity silicon without carbon or other contamination so that it can be recycled, for example, to a melting pot for re-use as high purity feed silicon for the growth of additional single crystal ingots.

In accordance with this invention, carbon in silicon dust is removed by promoting chemical reactions between the carbon impurity present in the silicon dust and silicon dioxide ($SiO_2$) present as a protective coating on the silicon particles, thereby to form gaseous products such as CO and SiO. This is achieved by heating the silicon dust in an inert atmosphere followed by vacuum heating. During this operation, gaseous products such as CO and SiO are removed, leaving the bulk of the silicon essentially free of carbon. The silicon dust is then further refined by mixing from about 2 to about 5 weight percent of a special flux therewith to further purify the silicon without contaminating the silicon in a manner unacceptable to the rigorous demands of the semiconductor and photovoltaic industries. The flux has a melting point, fluidity characteristics and vapor pressure at the temperature of molten silicon suitable to yield the high purity silicon product desired. The flux employed in accordance with this invention is comprised essentially of fluorides of one or more metals selected from the group of alkali metals and alkaline earth metals. For example, preferred fluxes include sodium fluoride and ternary alkaline earth metal fluorides, such as $(Ca, Mg, Ba)F_2$ wherein the calcium fluoride is present in the amount of 28 weight percent, magnesium fluoride 20 weight percent and barium fluoride 52 weight percent, all weights being based upon the total weight of the flux. It has been discovered that the fluxes of this invention can be employed at reagent grade impurity and the desired purity silicon product still obtained. Of course, higher purity fluxes can be employed but are not necessary. The fluoride or fluoride mixtures that comprise the flux are mixed with the silicon powder to be refined under ambient conditions of temperatures and pressure until an essentially homogeneous mixture is obtained. The mixture is thereafter heated under ambient pressure, with or without an inert atmosphere, at an elevated temperature and for a time sufficient to produce molten silicon and slag as separate phases. The heating is preferably carried out at a temperature of at least about 1410° C. and can be higher if desired, depending upon the temperature limitations of the material that makes up the crucible holding the silicon-flux mixture. After a significant amount of molten silicon phase is formed, the slag and molten silicon phases can be separated and the silicon phase recovered for re-use in the manufacturing operations in which the waste silicon was generated in the first place. The separation can be made in any conventional manner well known in the art such as skimming the slag off the top of the molten silicon and thereafter cooling the molten silicon in situ or pouring the molten silicon into a mold or other crucible for cooling.

This refining process can be repeated on the same silicon or slag material if desired for further recovery of high purity silicon. This is particularly desirable where there is a high content of solid material even after fluxing at a high temperature in accordance with this invention. The process of this invention can also be employed for recovering silicon remains from single crystal growth operations or anywhere else solidified silicon is left in a crucible or similar container after the container has been emptied of essentially all of its silicon content.

EXAMPLE

Silicon sawdust recovered from the process of sawing a single crystal silicon ingot into wafers for use in a photovoltaic panel was recovered from the sawing operation and was found to contain carbon in an amount approaching 3 weight percent based on the total weight of the silicon. The carbon was present due to the carbon beam upon which the single crystal was mounted for sawing. Other minor impurities were also present such as silicon dioxide and chemicals used in the sawing process such as detergents employed in the cooling water to keep the silicon sawdust from clinging to the saw blade and the like.

Silicon is recovered by first heating the silicon dust in a quartz crucible to at least 1500° C. in an argon atmosphere for about 15 minutes followed by application of a vacuum (at least 10 torr) for about 30 minutes during which gaseous CO and SiO is removed. The silicon dust was then further refined by mixing with 3 weight percent sodium fluoride at room temperature and ambient pressure until an essentially homogeneous mixture was obtained which mixture is then transferred to a quartz crucible and heated at 1500° C. for about 30 minutes in an argon atmosphere at which time there were two discrete phases in the crucible, a lower phase being molten silicon and an upper phase, floating on top of the molten silicon, which is slag and contains most of the impurities that were originally associated with the silicon waste. The heating was carried out under ambient pressure.

The crucible was then allowed to cool to room temperature under an air atmosphere to solidify the silicon.

The solidified silicon can, if desired, be washed with a strong acid such as hydrofluoric acid to remove any adhering slag material.

The resulting refined silicon ingot is of a purity of greater than 99.99% and is suitable for re-use as high purity feed silicon material for various processes in the semiconductor and photovoltaic industries.

Reasonable variations and modifications are possible within the scope of this disclosure without departing from the spirit and scope of this invention.

We claim:
1. A method for refining silicon particles which are contaminated with carbon and other impurities to produce high purity silicon comprising vacuum refining the silicon particles in an inert atmosphere and at an elevated temperature to form gaseous CO and SiO, thereafter mixing with said silicon an effective fluxing amount of at least one fluoride of a metal selected from the group consisting of alkali metals and alkaline earth metals, heating said mixture at an elevated temperature and for a time sufficient to produce molten silicon and slag as separate phases, separating said slag from said silicon, and recovering said silicon.

2. The method according to claim 1 wherein the silicon particles are heated to at least 1500° C. for said vacuum refining and said vacuum is at least 10 torr.

3. The method according to claim 1 wherein from about 2 to about 5 weight percent of flux material, based on the weight of the silicon to be refined, is mixed with the silicon that is to be refined.

4. The method according to claim 1 wherein said flux material is essentially sodium fluoride.

5. The method according to claim 1 wherein said flux material is essentially a mixture of fluorides of calcium, magnesium and barium.

6. The method according to claim 1 wherein said mixture is heated to at least about 1410° C. for a time sufficient to form a significant amount of said molten silicon phase.

7. The method according to claim 1 wherein said slag is separated from said molten silicon by skimming said slag off the top of said molten silicon phase.

* * * * *